April 30, 1963    R. L. PLUNKETT    3,087,191
MOLDED PLASTIC DAUBER CAP CONSTRUCTION
Filed July 7, 1958

INVENTOR.
ROBERT L. PLUNKETT
BY
ATTORNEY

# United States Patent Office 3,087,191
Patented Apr. 30, 1963

3,087,191
MOLDED PLASTIC DAUBER CAP CONSTRUCTION
Robert L. Plunkett, 14 Orsini Drive, Larchmont, N.Y.
Filed July 7, 1958, Ser. No. 746,873
1 Claim. (Cl. 15—609)

The present invention relates to a molded plastic dauber cap construction and it particularly relates to a one piece molded construction having an automatic seal in the cap thereof and an integrally molded centrally depending post.

It is among the objects of the present invention to provide a simple molded dauber cap construction which may be readily formed in one piece and which, without the use of gaskets, may be utilized to adequately seal a container or flask receptacle having a liquid to be daubed therein.

Another object is to provide a novel integrally molded dauber cap construction which may be molded in large quantity and at low cost.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to provide an integrally molded cap with an axial postlike extension, with the junction of the cap and the outside of the base of the central post having an upwardly extending flexible peripherally oblique flange which aids in forming a seal, eliminating the need for a gasket.

A particular object of the present invention resides in the fact that the dauber material or pile or plush fabric may be molded onto the end of the dauber axial post so as to form a complete dauber construction with a minimum of operations and at a very low cost, with assurance that a stable structure will be formed.

It has been found most satisfactory to form the material of rigid, high impact polyethylene which is very stiff in thick section, yet very soft and pliable in thin section.

Normally, strips of the pile material or mohair, having an interior of laminated polyethylene, may be molded on to the ends of the dauber posts and perforated so that the various caps may be readily separated from one another.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views.

Figures 2, 5:
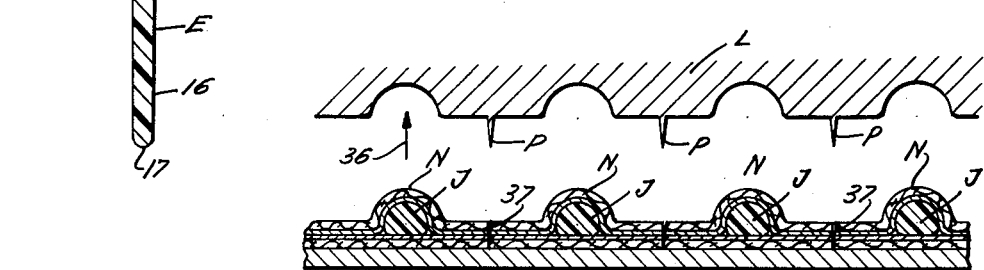
FIG. 2 is a transverse vertical sectional view of the cap construction upon a slightly reduced scale as compared to FIG. 1, showing the end of the post or extension before the mohair material has been mounted thereon or molded thereto.
FIG. 5 is a transverse sectional view similar to FIG. 4 taken upon the line 5—5 of FIG. 3, showing the mohair tips after they have been molded on to the ends of the central posts or rods of the integrally molded caps.
Figure 1:
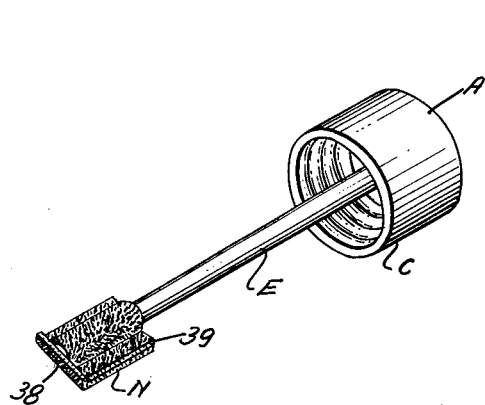
FIG. 1 is a side perspective view of a completed integrally molded dauber cap construction with the mohair dauber tip substantially sealed or united thereto.
Figure 6:
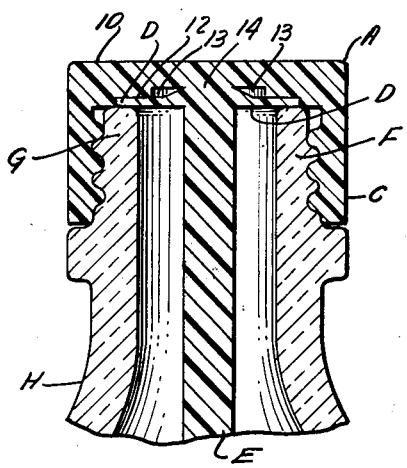
FIG. 6 is a transverse vertical sectional view, showing the cap of FIG. 1 in its tightened position upon the mouth of a bottle or jar, as the case may be.

Referring to FIGS. 1, 2 and 6, the cap A, which may be molded integrally of rigid polyethylene, has an interior step recess B, a screw skirt C, a sealing oblique flange D, and a centrally depending post E.

The screw skirt C is designed to be threaded on to the threaded nipple F, with the flange D forming a seal against the mouth G of the jar of container H.

Figure 4:
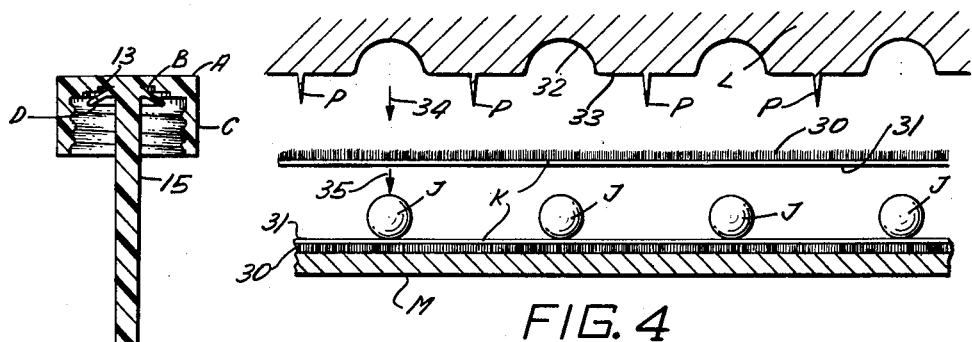
FIG. 4 is a diagrammatic transverse sectional view upon an enlarged scale, showing the posts in a position prior to a molding operation before the upper die has caused the mohair tips to be applied with heat and pressure.

The end of the post or rod E, as indicated at J in FIG. 4, is designed to receive the mohair dauber material K which is pressed thereon by means of the upper die element L and the lower die element M. This mohair material K is then cut so that each post E will have an end dauber portion N as a result of the cutting or scarring resulting from the knives or perforating members P.

Referring specifically to the cap, the base 10 on the underside has a first reduced step portion 12 and then a second reduced step portion 13.

At the central portion of the reduced step portion 13 is the junction 14, with the post member E, which is molded integrally with the base 10. At this junction there is provided the flexible sealing fin or vane D, which is fixed adjacent its junction and thins out towards its periphery.

This vane is designed, when the cap A is screwed down, to fit closely within the outer step portion 12, as is best shown in FIG. 6, and form a liquid-tight and airtight seal without a gasket.

In respect to the dauber post or rod E, this is fixed adjacent the space at 15 and thins out at 16 to form the rounded end 17.

Figure 3:
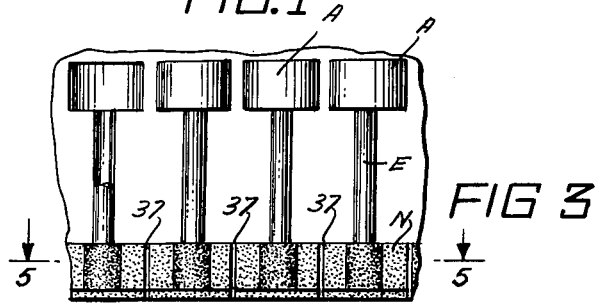
FIG. 3 is a side elevational view, showing an outline of a plurality of molded caps in position after they have been molded to the mohair tipping material.

The mohair or dauber material is best shown in FIG. 4 before attachment and in FIGS. 1, 3 and 5 after attachment. It consists of an outer layer of mohair 30, on the inside woven face of which is attached a layer of polyethylene sheeting 31, which may be between 3 to 10 mils in thickness, with a preferred thickness of 5 mils.

The upper cavity mold L has a series of cavities 32, with flat pressure faces 33 and with a series of knives or perforating means P.

The lower platen or die element M will receive a flat strip of the mohair with the pile down, as shown in FIG. 4, while the upper strip may be positioned on top of the ends J of the rods E.

During the molding operation, the lower platen M will be in fixed position, while the upper element L will move downwardly, as indicated by the arrow 34, pressing down the upper mohair, as indicated by the arrow 35, onto and around the ends J of the posts E in the manner indicated in FIG. 5.

After a considerable time for heat and pressure, the upper die element L is lifted, as indicated by the arrow 36.

When this occurs, the ends J will have been flattened, as indicated in FIG. 5, and the mohair will have been wrapped around the ends, as indicated at N in FIGS. 1, 3 and 5, and the portions of mohair will have been severed, as indicated at 37 in FIGS. 3 and 5.

The attachment will be formed between the polyethylene sheeting of the mohair and the flattened ends J of the posts E, with the ends and side edges 38 and 39 of the sheets being integrally attached.

By forming the daubers in the manner described in connection with FIGS. 1 to 6, it is possible to obtain a rigid molded polyethylene structure which permits a substantially integral dauber cap combination not requiring any sealing gaskets and in which the dauber element will be substantially part of the structure of the central post element.

As many changes could be made in the above molded plastic dauber cap construction, and many widely different embodiments of this invention could be made without departure from the scope of the claim, it is intended that all matter contained in the above description shall be interpreted as illustrative and not in a limiting sense.

Having now particularly described and ascertained the nature of the invention, and in what manner the same is to be performed, what is claimed is:

In a combination dauber and cap integrally molded from rigid polyethylene for use as a closure on a container and comprising a cap having means for detachable securement to the mouth of a container and a dauber element depending from the underside of said cap for projection down into the container, the improvement which comprises a spreader element secured to the bottom end of said dauber element and consisting of two plies of spreader material permanently united on said bottom end from opposite sides thereof, said plies of spreader material having a pile projecting outwardly and having a heat sealable inner plastic lining.

References Cited in the file of this patent

UNITED STATES PATENTS

| | | |
|---|---|---|
| 1,157,413 | Nesper | Oct. 19, 1915 |
| 1,615,603 | Vickery | Jan. 25, 1927 |
| 1,836,103 | Yutts | Dec. 15, 1931 |
| 1,950,293 | Carvalho | Mar. 6, 1934 |
| 2,090,354 | Massman | Aug. 17, 1937 |
| 2,182,046 | Crabbe | Dec. 5, 1939 |
| 2,258,115 | Kingman | Oct. 7, 1941 |
| 2,346,782 | Piluso | Apr. 18, 1944 |
| 2,550,586 | Nardone | Apr. 24, 1951 |
| 2,681,463 | Gordon | June 22, 1954 |
| 2,735,721 | Rafferty | Feb. 21, 1956 |
| 2,748,969 | Leary | June 5, 1956 |
| 2,849,739 | Dresden | Sept. 2, 1958 |
| 2,904,814 | Scholl | Sept. 22, 1959 |
| 2,904,837 | Crabbe | Sept. 22, 1959 |

FOREIGN PATENTS

| | | |
|---|---|---|
| 509,876 | Great Britain | July 24, 1939 |